(12) United States Patent
Eichelberger et al.

(10) Patent No.: US 10,915,390 B2
(45) Date of Patent: Feb. 9, 2021

(54) FAULT DETERMINATION VIA TELEMETRY DATA AND STATE CHANGES

(71) Applicant: HEWLETT-PACKARD DEVELOPMENT COMPANY, L.P., Houston, TX (US)

(72) Inventors: Matheus Eichelberger, Porto Alegre (BR); Roberto Coutinho, Porto Alegre (BR); Augusto Queiroz de Macedo, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 206 days.

(21) Appl. No.: 16/077,876

(22) PCT Filed: Feb. 3, 2017

(86) PCT No.: PCT/US2017/016437
§ 371 (c)(1),
(2) Date: Aug. 14, 2018

(87) PCT Pub. No.: WO2018/144011
PCT Pub. Date: Aug. 9, 2018

(65) Prior Publication Data
US 2019/0065297 A1    Feb. 28, 2019

(51) Int. Cl.
*G06F 11/00* (2006.01)
*G06F 11/07* (2006.01)
(Continued)

(52) U.S. Cl.
CPC .............. *G06F 11/079* (2013.01); *G06F 7/20* (2013.01); *G06F 11/0709* (2013.01);
(Continued)

(58) Field of Classification Search
CPC .............. G06F 11/079; G06F 11/0709; G06F 11/0751; G06F 11/0769; G06F 11/0787; G06F 11/0793; G06F 11/3476
See application file for complete search history.

(56) References Cited

U.S. PATENT DOCUMENTS

| 7,962,797 B2 | 6/2011 | Goldszmidt et al. |
| 8,060,259 B2 | 11/2011 | Budhraja et al. |

(Continued)

FOREIGN PATENT DOCUMENTS

| WO | 2006025845 A2 | 3/2006 |
| WO | 2014199177 A1 | 12/2014 |
| WO | 2015020922 A1 | 2/2015 |

OTHER PUBLICATIONS

Cancro et al , "An Interactive Visualization System for Analyzing Spacecraft Telemetry", Abstract, Retrieved from Internet: http://ieeexplore.ieee.org/document/4161690/, Mar. 3-10, 2007, 2 pages.
(Continued)

*Primary Examiner* — Katherine Lin
(74) *Attorney, Agent, or Firm* — Brooks Cameron & Huebsch

(57) ABSTRACT

In some examples, a computing device can determine a data state from telemetry data received from a plurality of client devices, determine a state change using the data state determined from the telemetry data, determine, using the state change, a potential cause of a fault of a component of a client device of the plurality of client devices, where the potential cause of the fault is determined in response to receiving a support inquiry from the client device, and display a timeline of state changes, where the timeline includes the determined state change of the client device.

15 Claims, 4 Drawing Sheets

330 —

332 — DETERMINING DATA STATES FROM TELEMETRY DATA RECEIVED FROM CLIENT DEVICES, STATE CHANGES USING THE DATA STATES DETERMINED FROM THE TELEMETRY DATA, POTENTIAL CAUSES OF A FAULT OF A COMPONENT OF A CLIENT DEVICE, AND CAUSES FOR STATE CHANGES USING THE DATA STATES AND THE TELEMETRY DATA VIA MACHINE LEARNING FOR DIFFERENT COMPONENTS OF THE CLIENT DEVICES

334 — DETERMINING SOLUTIONS FOR THE FAULT WITH THE CLIENT DEVICE

336 — DISPLAYING A TIMELINE OF THE DETERMINED STATE CHANGES OF THE CLIENT DEVICE TO PROVIDE FAULT SUPPORT TO THE CLIENT DEVICE

(51) Int. Cl.
*G06F 7/20* (2006.01)
*H04L 1/24* (2006.01)
*G06F 11/34* (2006.01)

(52) U.S. Cl.
CPC ...... *G06F 11/0751* (2013.01); *G06F 11/0769* (2013.01); *G06F 11/0787* (2013.01); *G06F 11/0793* (2013.01); *G06F 11/3476* (2013.01); *H04L 1/24* (2013.01)

(56) References Cited

U.S. PATENT DOCUMENTS

| | | | |
|---|---|---|---|
| 8,320,894 B1 * | 11/2012 | Raghunath | H04M 3/42229 455/416 |
| 9,590,880 B2 * | 3/2017 | Ashby | H04L 43/08 |
| 10,459,827 B1 * | 10/2019 | Aghdaie | G06F 11/0766 |
| 2004/0139156 A1 | 7/2004 | Matthews et al. | |
| 2005/0172170 A1 | 8/2005 | Thieret et al. | |
| 2015/0089054 A1 | 3/2015 | Rizzi et al. | |
| 2017/0171836 A1 * | 6/2017 | Gupta | H04W 4/06 |

OTHER PUBLICATIONS

Kim et al., "Root Cause Detection in a Service-Oriented Architecture", SIGMETRICS'13, Retrieved from Internet: http://i.stanford.edu/~mykim/pub/SIGMETRICS13-Monitoring.pdf, Jun. 17-21, 2013, 11 pages.

"Perspica Leverages the Power of Artificial Intelligence (AI) to Leapfrog Traditional Monitoring with Advanced Analytics", Retrieved from Internet: http://perspica.io/perspica-leverages-power-artificial-intelligence-ai-leapfrog-traditional-monitoring-advanced-analytics/, Aug. 24, 2016, 3 pages.

* cited by examiner

FAULT DETERMINATION VIA TELEMETRY DATA AND STATE CHANGES

BACKGROUND

Determining a cause of a fault in a client device can be a laborious process. Determining a cause of a fault may include questioning a user of a client device to determine information that may lead to the cause of the fault. If the cause of a fault is determined, a solution to correcting the fault may be determined.

DETAILED DESCRIPTION

Determining a fault of a client device may include asking a user of the client device questions to determine information that may be used to find a cause of the fault. In some instances, this questioning may be done by, for example, a customer or technical support agent. However, a user of a client device may provide inaccurate information to the support agent. In some instances, the cause of the fault may include an action taken by the user, leading to a challenging conversation in order for the support agent to communicate this to the user without damaging the consumer/manufacturer relationship.

Fault determination via state changes according to the disclosure allows for determination of faults of client devices using telemetry data from client devices. Using this telemetry data allows for faults to be determined without having to question a user of the client device. As a result, fault determination may be performed without having to question users, reducing a chance for inaccurate or incorrect information being used for fault determination and providing a better fault determination experience.

Figure 1:
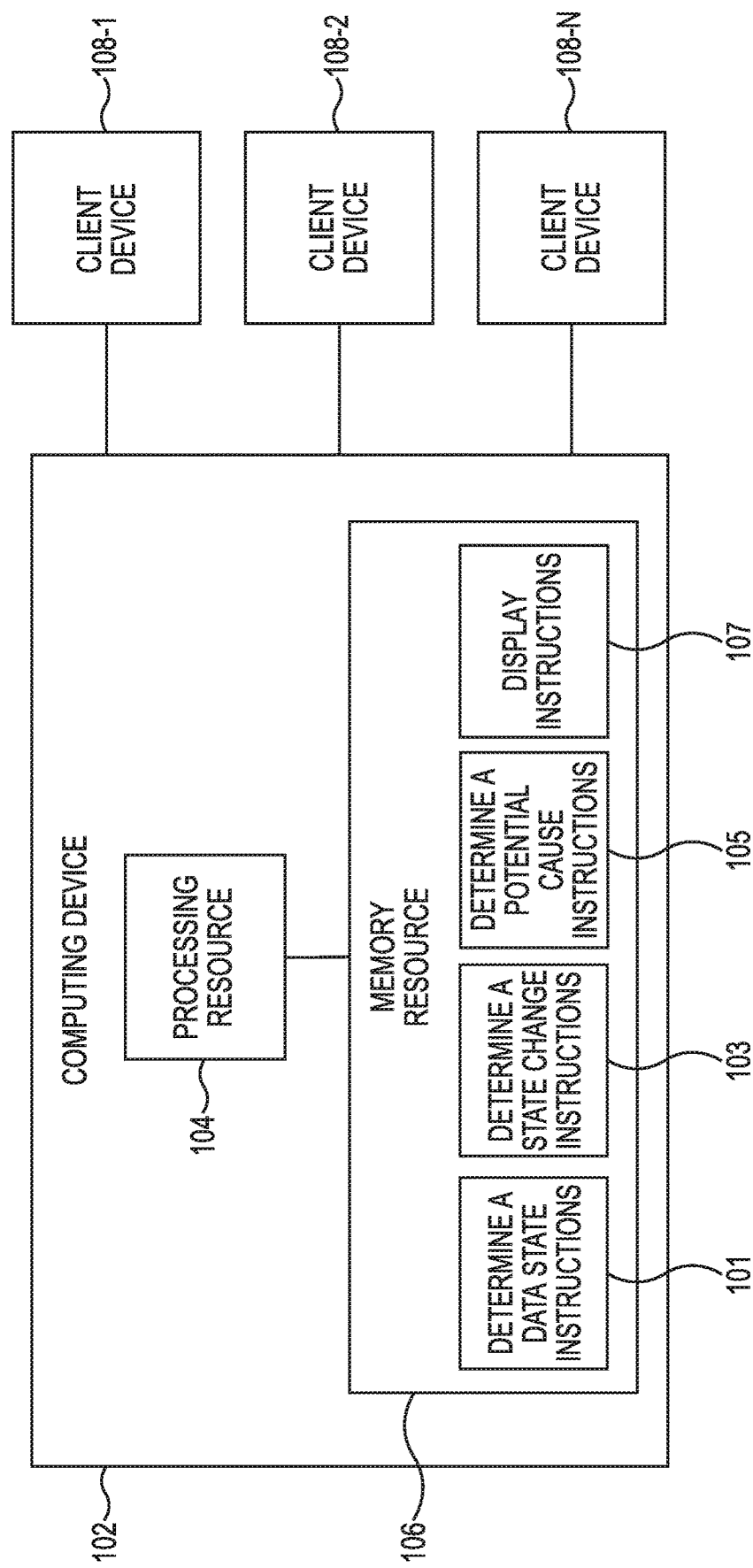
FIG. 1 is a diagram of an example of a computing device according to the present disclosure.

FIG. 1 is a diagram of an example of a computing device 102 according to the present disclosure. Computing device 102 can include a processing resource 104 and memory resource 106. Memory resource 106 can include machine-readable instructions, including determine a data state instructions 101, determine a state change instructions 103, determine a potential cause instructions 105, and display instructions 107.

Processing resource 104 may execute determine a data state instructions 101 to determine data states from telemetry data received from a plurality of client devices 108-1, 108-2, 108-N (referred to collectively as client devices 108). As used herein, a client device refers to a computing device such as, for example, a laptop computer, a desktop computer, and/or a mobile device, among other types of computing devices. As used herein, a mobile device refers to a device that may be carried and/or worn by a user, such as a smart phone, tablet, personal digital assistant (PDA), smart glasses, and/or a wrist-worn device (e.g., a smart watch), among other types of mobile devices.

Telemetry data can be received from client devices 108 via a network relationship. For example, telemetry data can be transmitted from client devices 108 to computing device 102 via a wired or wireless network. As used herein, telemetry data refers to data collected by client devices 108 and transmitted to computing device 102. The telemetry data collected by client devices 108 can be hardware data and/or software data of the client devices 108, among other types of data. Client devices 108 can include sensors to collect telemetry data. Sensors may include temperature and/or voltage sensors, among other types of sensors.

The wired or wireless network can be a network relationship that connects client devices 108 to computing device 102. Examples of such a network relationship can include a local area network (LAN), wide area network (WAN), personal area network (PAN), a distributed computing environment (e.g., a cloud computing environment), storage area network (SAN), Metropolitan area network (MAN), a cellular communications network, and/or the Internet, among other types of network relationships.

Telemetry data may be continually and/or periodically transmitted to computing device 102. For example, client device 108-1 may transmit telemetry data to computing device 102 periodically, such as every hour, or in response to an action, such as in response to client device 108-1 rebooting. In some examples, client devices 108 may transmit telemetry data when client devices 108 are powered off. For instance, a basic input/output system (BIOS) of client devices 108 may periodically transmit telemetry data to computing device 102 while client devices 108 are powered off. As used herein, a BIOS refers to a set of instructions in firmware that control input and output operations of a computing device.

As used herein, powered off may refer to a power state defined by a computing power specification. For example, powered off may refer to a mechanically off state, as defined by the Advanced Configuration and Power Interface (ACPI) specification. That is, computing device 102 may have power totally removed via a mechanical switch and/or a power cord being removed.

However, examples of the present disclosure are not limited to a mechanically off state. For instance, powered off may refer to a soft off state, such as a power supply unit (PSU) supplying power to a power button.

Although computing device 102 is shown in FIG. 1 and described as receiving telemetry data from client devices 108, examples of the disclosure are not so limited. For example, client devices 108 can transmit telemetry data to a server or other computing device remote from computing device 102, where computing device 102 can access the telemetry data via a network relationship.

A data state may include telemetry data over a period of time. For example, telemetry data may include a temperature of a processor of client device 108-1, and a data state may include the average temperature of the processor of client device 108-1 for the week starting on July 17$^{th}$ as being 56.7° C.

A state change is a change in a data state. In some examples, a state change may be an average temperature of the processor of client device 108-1 having risen from 56.7° C. to 71.9° C. from the week starting on July 17$^{th}$ to the next week. In some examples, a state change may be a change from a previous application to a new application being installed on client device 108-1.

Processing resource 104 may execute determine a state change instructions 103 to determine state changes using the data states determined from the telemetry data from client devices 108. For instance, a data state may change a threshold amount over a period of time, resulting in a state change. The threshold amount of change may be predetermined and/or configurable. The period of time may be predetermined and/or configurable. For example, a change in an average temperature of 20° C. or more of a processor of client devices 108 over a week may be a state change, but a change in an average temperature of 19° C. or less over a week may not be a state change.

State changes can include a level attribute. Computing device 102 may assign a level attribute to a state change based on a significance of a state change. That is, the level attribute can indicate how significant a state change is. For example, a rise in an average temperature from 10° C. to 20° C. over a week may be given a low level attribute indicating a state change that may not be significant, whereas a rise in an average temperature from 10° C. to 90° C. may be given a high level attribute indicating a state change that may be highly significant. The level attribute may be indicated to a user on a timeline by color coding, different icons, animation, and/or other audible or visual indications, as is further described herein with respect to FIG. 2. Level attributes may be predetermined and/or configurable.

Processing resource 104 may execute determine a potential cause instructions 105 to determine, using a state change of the state changes, potential causes of a fault of a component of a client device of the client devices 108 in response to receiving a support inquiry from the client device. The computing device 102 can determine the potential causes of the fault with the client device 108 using telemetry data from client device 108. For example, computing device 102 may utilize telemetry data from client device 108-1 in determining a cause of a fault with client device 108-1, although examples of the disclosure are not limited to using telemetry data from just client device 108-1. That is, telemetry data from client device 108-2 and/or client device 108-N may also be used in determining a cause of a fault with client device 108-1, as is further described herein.

In some examples, a support inquiry may be received by computing device 102 indicating that client device 108-1 has been overheating while in use. Two state changes of client device 108-1 may include an average temperature of the processor of client device 108-1 having risen 25° C. over a period of a week, and a new application having been installed on client device 108-1 prior to the increase in average temperature of the processor of client device 108-1. Computing device 102 may determine that the potential cause of the increase in average temperature of the processor of client device 108-1 may be the result of the installation of the new application on client device 108-1.

In some examples, a support inquiry may be received by computing device 102 indicating that an amount of power provided by a battery of client device 108-1 has been degrading. Two state changes of client device 108-1 may include an average temperature of the battery of client device 108-1 having risen 15° C. over a period of a week, and a new application having been installed on client device 108-1 prior to the increase in average temperature of the battery of client device 108-1. Computing device 102 may determine that the potential cause of the decrease in power provided by the battery of client device 108-1 may be the result of the installation of the new application on client device 108-1.

Although described as determining potential causes of a fault of a component of a client device of the client devices 108 in response to receiving a support inquiry from the client device, examples of the disclosure are not so limited. For example, potential causes of a fault of a client device of the client devices 108 may be determined in response to a state change being determined from the telemetry data. In response to determining potential causes of the fault of the client device of the client devices 108, computing device 102 may generate and transmit an alert to the client device of the client devices 108. The alert can inform a user of the client device of the fault and/or include the potential causes of the fault.

Computing device 102 can determine a client device population of client device 108. As used herein, client device population refers to a particular group and/or type of client device, and/or a group of client device with a same particular component. For example, client device 108-1 may be a laptop. Computing device 102 can determine that, based on client device 108-1 being a laptop, the client device population of client device 108-1 includes laptops, although examples of the disclosure are not limited to laptops. In some examples, a client device population may include a client device type, such as a desktop, laptop, and/or mobile device. In some examples, a client device population may include a component of a client device, such as laptops that include the same processor, or mobile devices that include the same type of battery.

The client device population may be determined in various ways. For example, computing device 102 can utilize a serial number of a client device 108, a model number of client device 108, a product identification (ID) of client device 108, and/or a manufacturer of client device 108, although examples of the disclosure are not limited to the above listed ways of determining a client device population.

Computing device 102 can determine potential causes of a fault with client device 108 using telemetry data from a client device population that includes client device 108. For example, if client devices 108-1, 108-2, and 108-N are in the same client device population, computing device 102 may utilize telemetry data from client device 108-2 and/or client device 108-N to determine potential causes of a fault with client device 108-1.

In some examples, a support inquiry may be received by computing device 102 indicating that client device 108-1 has been overheating while in use. Two state changes of client devices 108-1, 108-2, and/or 108-N may include an average temperature of the processor of client devices 108-1, 108-2, and/or 108-N having risen at least 25° C. over a period of a week, and a new application having been installed on client devices 108-1, 108-2, and 108-N prior to the increase in average temperature of the processor of client devices 108-1, 108-2, and 108-N. Computing device 102 may determine that the potential cause of the increase in average temperature of the processor of client device 108-1 may be the result of the installation of the new application on client device 108-1 as a result of similar state changes occurring for client devices 108-2 and 108-N.

In some examples, a support inquiry may be received by computing device 102 indicating that an amount of power provided by a battery of client device 108-1 has been degrading. Two state changes of client devices 108-1, 108-2, and/or 108-N may include an average temperature of the battery of client devices 108-1, 108-2, and 108-N having risen at least 15° C. over a period of a week, and a new application having been installed on client devices 108-1, 108-2, and 108-N prior to the increase in average temperature of the battery of client devices 108-1, 108-2, and 108-N. Computing device 102 may determine that the potential cause of the decrease in power provided by the battery of client device 108-1 may be the result of the installation of the new application on client device 108-1 as a result of similar state changes occurring for client devices 108-2 and 108-N.

Processing resource 104 may execute display instructions 107 to display a timeline of the determined state changes of client devices 108. The timeline can include various information to provide a user, such as a support agent, with various insights into potential causes of faults of client devices 108, as is further described in connection with FIG. 2.

Computing device 102 can determine causes for state changes using the data states and the telemetry data via machine learning for different components of client devices 108. Using telemetry data, data states, and state changes of client devices 108, computing device 102 may utilize machine learning to determine causes for state changes by correlating patterns in telemetry data and data states with state changes.

In some examples, computing device 102 may correlate the effect of a rise in average temperature of a processor of client device 108 to an installation of an application to client device 108. This correlation may be stored and used in response to further support inquiries from other client devices 108. That is, computing device 102 may utilize this correlation to flag other support inquiries received by computing device 102 from other client devices 108 that may be experiencing similar state changes. The other client devices 108 may be in the same population data set, as is further described herein. Computing device 102 may flag support inquiries in response to a user input, as is further described in connection with FIG. 2.

Causes for state changes using telemetry data may be determined from a client device population that includes client device 108. By correlating and flagging certain state changes and support inquiries, trends may be determined in client device populations. For instance, a state change may be determined to be triggered in a client device population indicating that a component of client devices 108 included in the client device population may be faulty.

In some examples, a user may determine a correlation in telemetry data and data states and state changes. For example, a user may review trends in client device populations and determine a correlation in telemetry data and data states and state changes. The user can label the correlation in telemetry data and data states and state changes as a cause of a fault on the timeline via a user input to computing device 102.

In some examples, trend information determined by computing device 102 and/or determined by a user may be utilized by customer and/or technical support to easily and accurately troubleshoot client devices in response to support inquiries. In some examples, trend information determined by computing device 102 and/or determined by a user may be utilized by designers, engineers, or other personnel to recall, replace, revise, and/or upgrade components of client devices and/or client devices.

Causes may be governed by various configurable and/or predetermined metrics. In some examples, a cause may be determined in response to a state change having a deviation from a mean or median value that exceeds a predetermined threshold. For instance, a deviation of an average temperature of a processor of a client device 108 of 20° C. or higher may determine a cause (e.g., a new application having been installed on client device 108), but a deviation of an average temperature of the processor of the client device 108 of 19° C. or lower may not determine a cause (e.g., the new application was installed on client device 108, but may not be the cause of the deviation in average temperature of the processor of client device 108).

In some examples, a cause may be determined in response to a state change occurring to a minimum threshold number of client devices 108. For instance, a deviation in an average temperature of a processor of a client device 108-1 of 20° C. or higher may determine a cause (e.g., a new application having been installed on client device 108-1) if one hundred or more client devices 108 experience the deviation in the average temperature of the processors of 20° C. or higher and the same new application having been installed. The one hundred or more client devices may be in the same client device population as client device 108. The minimum threshold number of client devices 108 may be predetermined and/or configurable.

Although causes are described above as being governed individually by the above configurable and/or predetermined metrics, examples of the disclosure are not so limited. For example, causes may be determined in response to a deviation from a mean or median that exceeds a predetermined threshold in combination with a state change occurring to a minimum threshold number of client devices, or in combination with any other predetermined and/or configurable metrics.

Various machine learning techniques may be utilized by computing device 102 to determine causes for state changes. For example, classification techniques, regression techniques, decision techniques, recommendation techniques, clustering techniques, and/or topic modeling techniques may be utilized, among other machine learning techniques.

In some examples, computing device 102 may utilize classification techniques. Classification techniques may include logistic regression and/or naïve Bayes, among other machine learning classification techniques.

In some examples, computing device 102 may utilize regression techniques. Regression techniques may include generalized linear regression and/or survival regression, among other machine learning regression techniques.

In some examples, computing device 102 may utilize decision techniques. Decision techniques may include decision trees, random forests, and/or gradient-boosted trees, among other machine learning decision techniques.

In some examples, computing device 102 may utilize recommendation techniques. Recommendation techniques may include alternating least squares (ALS), among other machine learning recommendation techniques.

In some examples, computing device 102 may utilize clustering techniques. Clustering techniques may include K-means and/or Gaussian mixtures (GMMs), among other machine learning clustering techniques.

In some examples, computing device 102 may utilize topic modeling techniques. Topic modeling techniques may include latent Dirichlet allocation (LDA), frequent item sets, association rules, and/or pattern mining, among other machine learning topic modeling techniques.

Processing resource 104 may be a central processing unit (CPU), a semiconductor based microprocessor, and/or other hardware devices suitable for retrieval and execution of machine-readable instructions 101, 103, 105, 107 stored in memory resource 106. Processing resource 104 may fetch, decode, and execute instructions 101, 103, 105, 107. As an alternative or in addition to retrieving and executing instructions 101, 103, 105, 107, processing resource 104 may include a plurality of electronic circuits that include electronic components for performing the functionality of instructions 101, 103, 105, 107.

Memory resource 106 may be any electronic, magnetic, optical, or other physical storage device that stores executable instructions 101, 103, 105, 107 and/or data. Thus, memory resource 106 may be, for example, Random Access Memory (RAM), an Electrically-Erasable Programmable Read-Only Memory (EEPROM), a storage drive, an optical disc, and the like. Memory resource 106 may be disposed within computing device 102, as shown in FIG. 1. Additionally and/or alternatively, memory resource 106 may be a portable, external or remote storage medium, for example, that allows computing device 102 to download the instructions 101, 103, 105, 107 from the portable/external/remote storage medium.

Fault determination via telemetry data and state changes can allow for determining causes of faults by utilizing machine learning techniques to correlate state changes to data states to identify trends in client device population. These trends can be utilized by customer and/or technical support to quickly and easily determine faults in a client device in response to a support inquiry for the customer device so that the client device or a component of the client device may be replaced. These trends may be utilized by designers, engineers, or other personnel to design around and/or find solutions for common faults of client devices.

Figure 2:
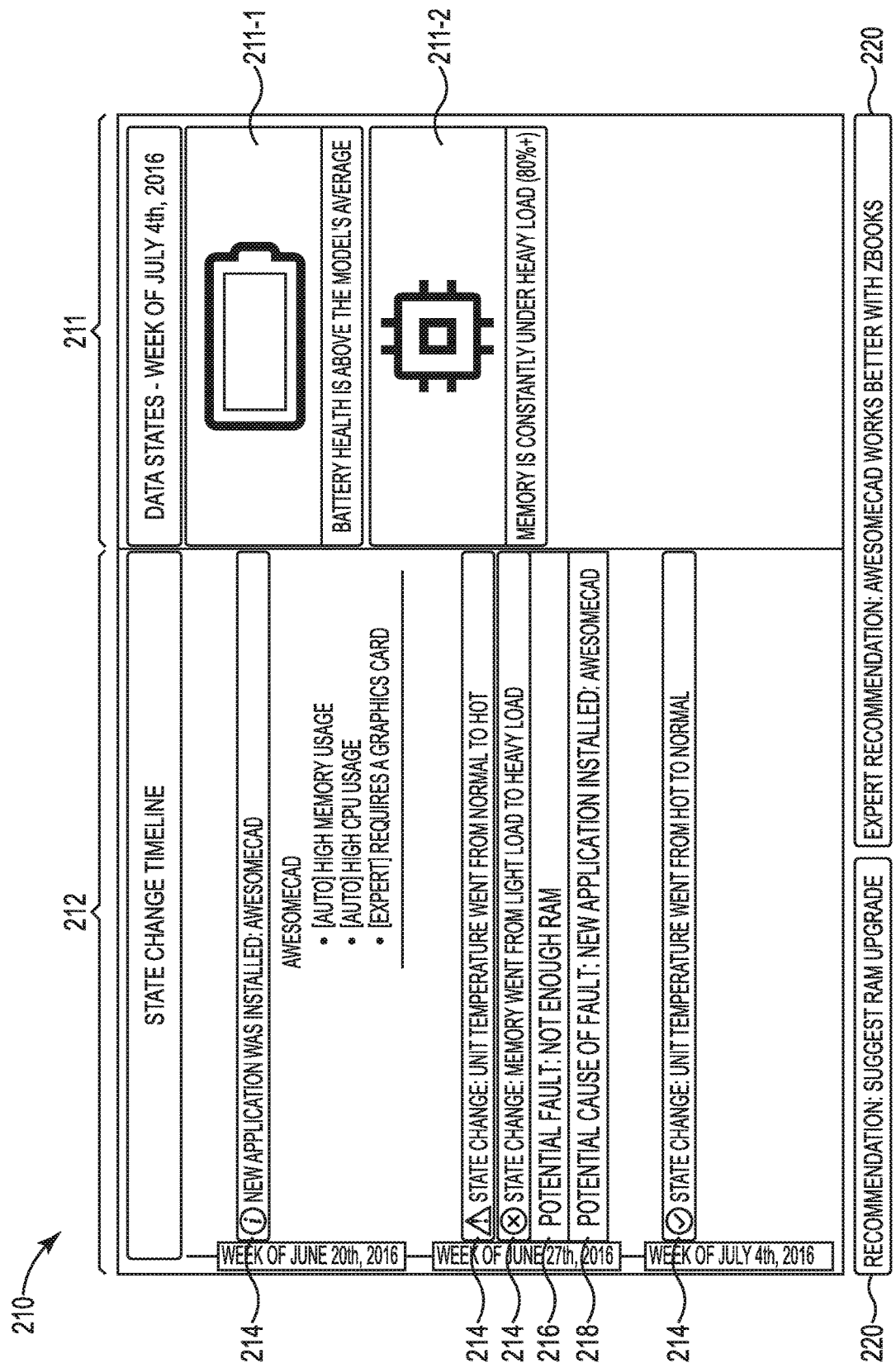
FIG. 2 illustrates an example of a user interface showing a timeline, according to the present disclosure.

FIG. 2 illustrates an example of a user interface 210 showing a timeline 212, according to the present disclosure. As shown in FIG. 2, user interface 210 may include various pieces of information about a client device (e.g., client device 108, described in connection with FIG. 1), including data states 211, timeline 212 and solutions 220. Data states 211 can include battery health 211-1 and memory load 211-2. Timeline 212 can include state changes 214, potential fault 216, and potential cause 218 of the potential fault 216. User interface 210 can be generated by a computing device (e.g., computing device 102, described in connection with FIG. 1).

Data states 211 may be shown on user interface 210. For example, data states 211 may be shown for the week of Jul. 4, 2016, and may include battery health 211-1 indicating battery health is above the client device model's average battery health. That is, the client device battery health, as indicated by battery health 211-1, may be above the median battery health of other client devices in a client device population that includes the client device. Data states 211 may include memory load 211-2, indicating that the memory of the client device is constantly under a heavy load.

The determined state changes 214 of the client device can be shown in timeline 212 in chronological order. That is, determined state changes 214 may arranged on timeline 212 such that state changes 214 follow one after another in time. For example, as shown in FIG. 2, a new application was installed the week of Jun. 20, 2016. The unit temperature of the client device went from normal to hot and the memory of the client device went from a light load to a heavy load the week of Jun. 27, 2016. The unit temperature went from hot to normal the week of Jul. 4, 2016.

Timeline 212 may include potential faults 216 of the client device. For example, state changes 214 may illustrate the unit temperature of the client device went from normal to hot and the memory of the client device went from a light load to a heavy load, which may indicate a potential fault 216 that the client device may be include enough random access memory (RAM).

Timeline 212 may include potential causes 218 of the fault with the client device. For example, a potential cause 218 of the unit temperature of the client device going from normal to hot and the memory of the client device going from a light load to a heavy load may be that a new application was installed on the client device. That is, the new application may be causing the increase in unit temperature of the client device and the increase in the memory load of the client device.

Solutions 220 to the potential fault 216 may be a suggested solution. For example, a solution 220 for the unit temperature of the client device going from normal to hot and the memory of the client device going from a light load to a heavy load may be a RAM upgrade. In some examples, a solution 220 may include an expert recommendation that the new application installed works better with an additional or different application installed (e.g., ZBooks). The expert recommendation may be a recommendation generated utilizing trends from other client devices in a client device population that includes the client device, as described in connection with FIG. 1.

Although shown in FIG. 2 as having two solutions 220, examples of the disclosure are not so limited. For example, there may be one solution or more than two solutions for a given potential fault.

Timeline 212 may include color coding, different icons, animations, and/or other audible or visual indications to prioritize state changes 214, potential faults 216, potential causes 218, solutions 220, and/or data states 211-1, 211-2. For example, state change 214 indicating the unit temperature of the client device has gone from normal to hot may be given a high level attribute indicating the state change may be highly significant, as the client device overheating may permanently damage the client device.

Although not shown in FIG. 2 for clarity and so as not to obscure examples of the disclosure, telemetry data may be flagged in response to a user input. For example, a user may flag state change 214 indicating the unit temperature of the client device has gone from normal to hot. This state change 214 may be utilized by various machine learning techniques to determine causes for state changes, as described in connection with FIG. 1.

Displaying timeline 212 can provide a visualization of determined state changes 214 of a client device such that a user may utilize the timeline to provide support to the client device in response to a support inquiry. Utilizing the timeline can allow for quick and easy determination of faults in client devices.

Figure 3:
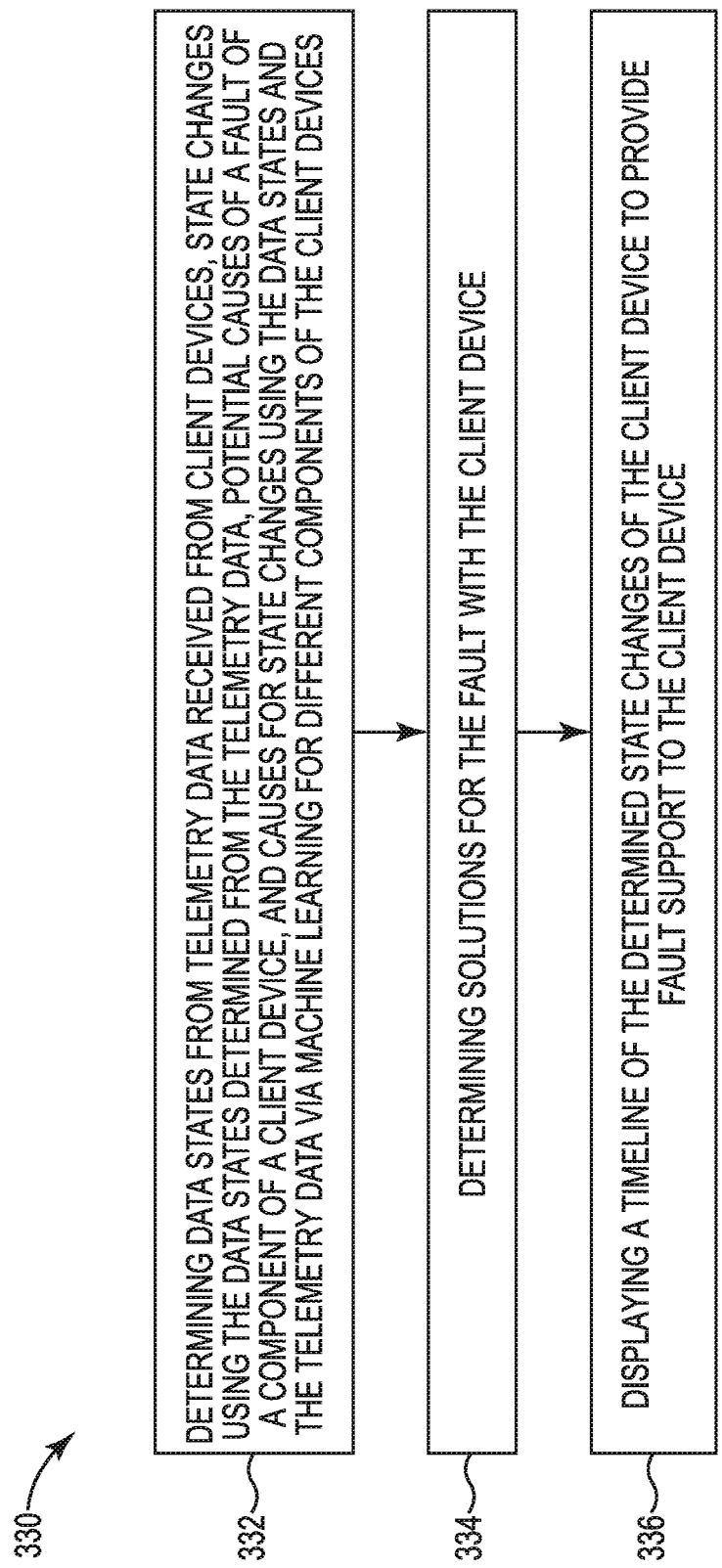
FIG. 3 illustrates an example of a method of fault determination via telemetry data and state changes, according to the present disclosure.

FIG. 3 illustrates an example of a method 330 of fault determination via telemetry data and state changes, according to the present disclosure. Method 330 may be performed, for example, by computing device 102 described in connection with FIG. 1.

At 332, the method 330 includes determining data states from telemetry data received from client devices, state changes using the data states determined from the telemetry data, potential causes of a fault of a component of a client device, and causes for state changes using the data states and the telemetry data via machine learning for different components of the client devices.

As previously described, a data state may include telemetry data over a period of time. Data states may include temperatures of client devices, temperatures of components of client devices, battery information of client devices such as RealTimeClock (RTC) battery usage, memory resource usage of client devices, plug and play usage profiles of client devices, mobility profiles of the client devices such as a network, battery, and geolocation mobility profile, BIOS information of the client devices, and/or operating system (OS) information of client devices, such as OS errors, although examples of the disclosure are not limited to the above data states.

As previously described, a state change may be a change in a data state. State changes may include software being installed and/or uninstalled on client devices, OS updates on client devices, changes in temperatures of client devices and/or changes in temperatures of components of client devices, changes in battery information of client devices such as changes in RTC battery information or battery usage, changes in plug and play usage profiles of client devices, changes in mobility profiles of the client devices such as changes in the network, battery, and geolocation mobility profiles, changes in the BIOS information of the client devices such as BIOS updates or BIOS errors, and/or changes in memory resource usage of client devices, although examples of the disclosure are not limited to the above state changes.

The method may include determining potential causes of the fault with the client device. Determining potential causes of the fault may include utilizing telemetry from the client device and/or utilizing telemetry data from a client device population that includes the client device.

Causes for state changes may be determined using the data states and the telemetry data via machine learning for different components of the client devices. For example, data states and telemetry data related to batteries of client devices in a same client device population as the client device may be utilized to determine cause for state changes relating to the battery of the client device. Machine learning techniques may include classification techniques, regression techniques, decision techniques, recommendation techniques, clustering techniques, and/or topic modeling techniques to correlate patterns in telemetry data and data states with state changes.

At 334, the method 330 includes determining solutions for the fault with the client device. Determining solutions may be in response to a state change based on the telemetry data of the client device. For example, a RAM upgrade may be in response to the memory of the client device going from a light load to a heavy load.

At 336, the method 330 includes displaying a timeline of the determined state changes of the client device to provide fault support to the client device. The timeline may provide a visualization to a user to allow a user to quickly and easily determine a fault in a client device as well as solutions for the fault.

Figure 4:
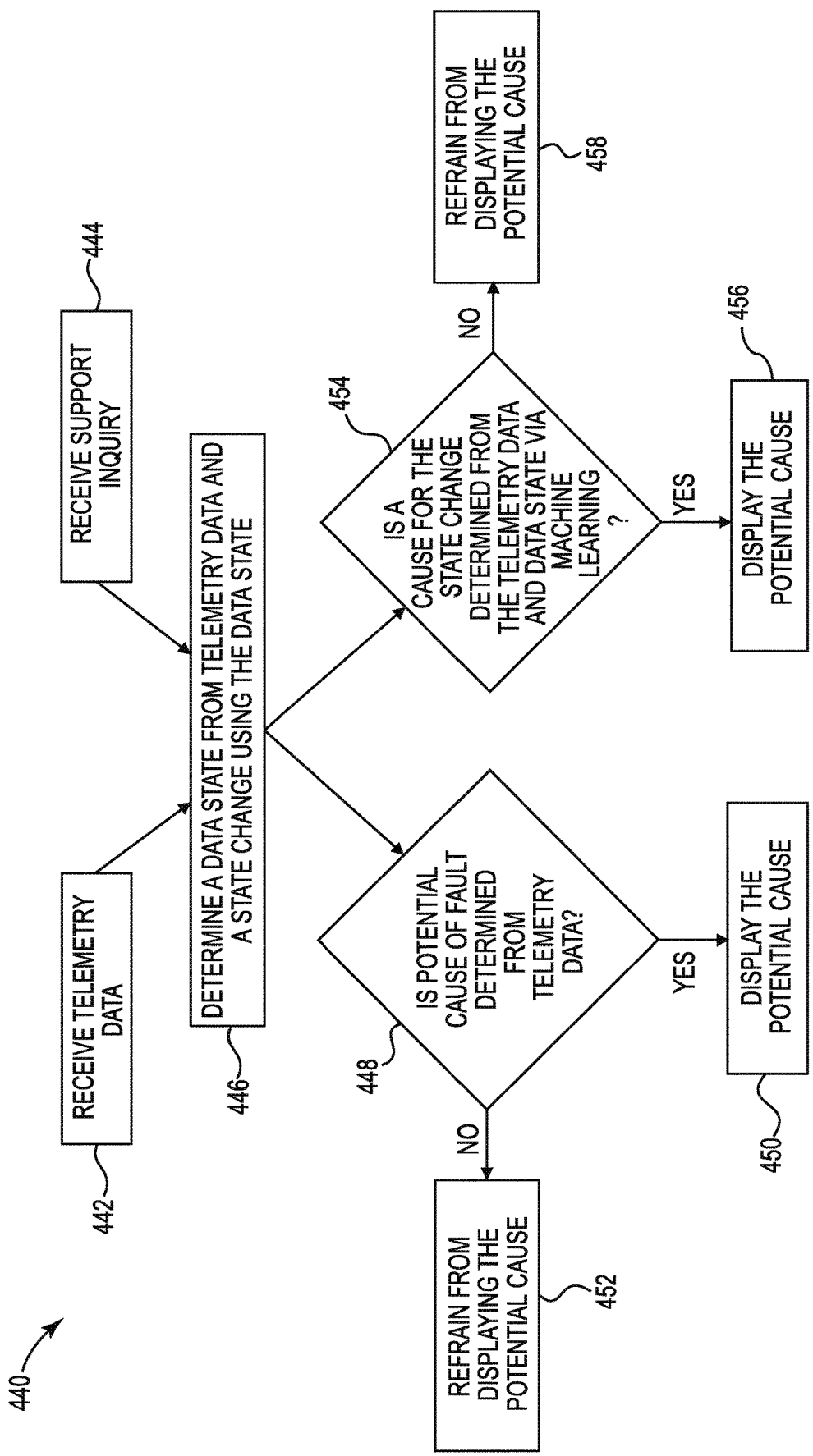
FIG. 4 illustrates an example flow chart for fault determination via telemetry data and state changes, according to the present disclosure.

FIG. 4 illustrates an example flow chart 440 for fault determination via telemetry data and state changes, according to the present disclosure. At 442, a computing device (e.g., computing device 102, described in connection with FIG. 1) may receive telemetry data. The computing device may receive telemetry data from client devices via a network relationship. The telemetry data can include various types of data, including hardware data and/or software data of the client devices.

At 444, the computing device may receive a support inquiry. For example, a user of a client device may submit a support inquiry for the client device which may be received by the computing device. The support inquiry may be in response to a fault of the client device, although examples of the disclosure are not limited to a support inquiry in response to a fault.

At 446 the computing device may determine a data state from telemetry data and a state change using the data state. A data state can include telemetry data over a period of time, and a state change can be a change in a data state. For example, a data state may be that the average temperature of a processor of the client device for a particular week may be 56.7° C., and a state change may be that the average temperature of the processor of the client device has risen from 56.7° C. to 71.9° C. from the particular week to the next week.

At 448, the computing device can determine whether a potential cause of the fault is able to be determined from the telemetry data. That is, the computing device can determine potential causes of the fault using the telemetry data.

At 450, the computing device can display the potential cause of the fault in response to the computing device determining a potential cause of a fault. Continuing with the example above, in response to a support inquiry, a user of the computing device, such as a support agent, can be shown potential causes of the fault of the client device. The support agent may communicate this information, as well as possible solutions for the fault, to the user of the client device. The computing device can refrain from displaying potential causes at 452 if the computing device is unable to determine a potential cause of the fault.

At 454, the computing device can determine whether a cause for a state change is determined from the telemetry data and the data state via machine learning. That is, the computing device may utilize machine learning to determine causes for state changes by correlating patterns in telemetry data and data states with state changes. Causes for state changes may be determined in a client device population, and trends may be determined in the client device population. For instance, a state change may be determined in a client device population that may indicate a component of those client devices of the client device population may be faulty.

At 456, the computing device may display the potential cause. That is, the computing device can display the potential cause to designers, engineers, or other personnel in order to respond to causes for state changes, such as to recall, replace, revise, and/or upgrade components of client devices and/or client devices, among other responses to causes for state changes. The computing device can refrain from displaying potential causes at 458 if the computing device is unable to determine a potential cause for a state change. The computing device may continue to utilize machine learning to determine causes for state changes as additional telemetry data is received by the computing device.

In the foregoing detailed description of the present disclosure, reference is made to the accompanying drawings that form a part hereof, and in which is shown by way of illustration how examples of the present disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a plurality of additional examples of the present disclosure. In addition, the proportion and the relative scale of the elements provided in the figures are intended to illustrate the examples of the present disclosure, and should not be taken in a limiting sense. As used herein, the designator "N", particularly with respect to reference numerals in the drawings, indicates that a plurality of the particular feature so designated can be included with examples of the present disclosure. The designators can represent the same or different numbers of the particular features.

What is claimed:

1. A computing device, comprising:
   a processing resource; and
   a memory resource storing machine-readable instructions to cause the processing resource to:
   determine a data state from telemetry data received from a plurality of client devices included in a client device population having a same particular component as a component of a client device of the plurality of client devices;
   determine a state change using the data state determined from the telemetry data in response to the data state changing a threshold amount over a period of time;
   determine, using the state change, a potential cause of a fault of the component of the client device of the plurality of client devices via machine learning, wherein the potential cause of the fault is determined in response to receiving a support inquiry from the client device; and
   display a timeline of state changes, wherein the timeline includes the determined state change of the client device.

2. The computing device of claim 1, including instructions to cause the processing resource to determine the potential cause of the fault with the client device using telemetry data from the client device.

3. The computing device of claim 1, including instructions to cause the processing resource to determine the potential cause of the fault with the client device using telemetry data from the client device population that includes the client device.

4. The computing device of claim 1, including instructions to cause the processing resource to determine the client device population of the client device.

5. The computing device of claim 4, wherein the client device population is determined from a group consisting of:
   a serial number of the client device;
   a model number of the client device;
   a product identification (ID) of the device; and
   a manufacturer of the device.

6. The computing device of claim 1, wherein a data state includes telemetry data over a period of time.

7. The computing device of claim 1, wherein a state change is a change in a data state.

8. The computing device of claim 1, wherein the timeline includes information from a group consisting of:
   the state changes in chronological order;
   the potential cause of the fault with the client device; and
   a solution to the fault of the client device.

9. A non-transitory machine-readable medium storing instructions executable by a processing resource to:
   determine data states from telemetry data received from a plurality of client devices included in a client device population having a same particular component as a component of a particular client device;
   determine a state change using the data states determined from the telemetry data in response to a particular data state included in the data states changing a threshold amount over a period of time;
   determine a cause for the state change of the particular component of the particular client device of the plurality of client devices using the data states and the telemetry data via machine learning.

10. The medium of claim 9, comprising instructions to determine the cause for the state change using telemetry data from a same client device population as the particular client device.

11. The medium of claim 9, comprising instructions to assign a level attribute to the state change based on a significance of the state change.

12. The medium of claim 9, comprising instructions to flag telemetry data in response to a user input.

13. A method, comprising:
   determining, by a computing device:
      data states from telemetry data received from a plurality of client devices included in a client device population having a same component as a component of a particular client device;
      a state change using the data states determined from the telemetry data in response to a particular data state included in the data states changing a threshold amount over a period of time;
      a potential cause of a fault of the component of the particular client device of the plurality of client devices using telemetry data from a group consisting of:
         telemetry data from the client device; and
         telemetry data from a client device population that includes the client device; and
      a cause for the state change using the data states and the telemetry data via machine learning;
   determining, by the computing device, solutions for the fault with the particular client device; and
   displaying, by the computing device, a timeline of the determined state change of the particular client device to provide fault support to the particular client device.

14. The method of claim 13, wherein the method includes determining the data state from a group consisting of:
   a temperature of components of the particular client device;
   battery information of the particular client device;
   memory resource usage of the particular client device;
   a plug and play usage profile of the particular client device;
   mobility profiles of the particular client device;
   basic input/output system (BIOS) information of the particular client device; and
   operating system (OS) information of the particular client device.

15. The method of claim 13, wherein the method includes determining the state change from a group consisting of:
   software installed on the particular client device;
   OS updates on the particular client device;
   changes in temperatures of components of the particular client device;
   changes in battery information of the particular client device;
   changes in plug and play usage profiles of the particular client device;
   changes in mobility profiles of the particular client device;
   changes in BIOS information of the particular client device; and
   changes in memory resource usage of the particular client device.

* * * * *